Dec. 1, 1953

C. F. SALZMAN, JR 2,661,260

MULTIPLE RANGE RECORDER

Filed May 23, 1950

INVENTOR
CHARLES F. SALZMAN, JR.,
BY
ATTORNEY

INVENTOR
CHARLES F. SALZMAN, JR.,
ATTORNEY

Patented Dec. 1, 1953

2,661,260

UNITED STATES PATENT OFFICE 2,661,260

MULTIPLE RANGE RECORDER

Charles F. Salzman, Jr., Stamford, Conn., assignor to American Cyanamid Company, New York, N. Y., a corporation of Maine Application May 23, 1950, Serial No. 163,733

4 Claims. (Cl. 346—65)

This invention relates to an improved, extended-range recording mechanism.

Recorders in which a movable recording element, such as a recording pen, is moved across a strip of recording paper, which is moved at right angles thereto at a steady rate with respect to another variable, usually time, are used very extensively in industry. Normally these recorders have an electrical circuit in which the movement of the pen is effected by the differential between a signal voltage and a fixed voltage. The range within which an accurate measurement of the signal voltage is possible depends on the size of the machine, that is to say the length of travel of the recording pen from one extreme to the other. Greater range can only be obtained by a larger machine and increase in size soon becomes so expensive as to be impractical. As a result, most recorders are of moderate size with pen travels of the order of 10 to 15 inches.

The disadvantage of the limited measuring range has been one of the limiting factors in the use of automatic recorders of the type referred to above. It has been proposed to use multiple ranges which are successively brought into play by a suitable step-by-step range-changing relay actuated by the recording pen when it reaches its limited position. When such a device is used at relatively high sensitivity, a signal of increasing strength moves the pen over until it reaches its limit, when a range of lower sensitivity is introduced. The pen then swings back to zero and starts recording on the new range. A number of ranges can be used in succession. This modification of the conventional recorder has, however, achieved but limited practical utilization because of several serious drawbacks. The first drawback is that it is entirely unsuitable for measuring changes of signal which occur fairly rapidly with respect to time or, more generally, the other parameter which controls movement of the recording paper. In order to have reasonable accuracy of measurement, the electrical instrument, which is a form of galvanometer, must be extremely highly damped so that there will be no hunting or over-shooting of the recording pen. This essential requirement of all accurate recorders means that the pen on striking its limit takes a considerable time to swing back to zero. In many instances this time may be sufficiently great that it interrupts the recording for long enough to leave out recording of phenomena occurring over a sufficiently long re-trace time to be significant.

Another disadvantage of the multiple range instruments which have been proposed and used in a few cases, is the very practical one that there is no labelling of the ranges, and reading of the record is therefore subject to errors if the ranges are not accurately counted. An even more serious defect is encountered when a reversal in range sequence is needed; in other words, where a signal may increase continuously for a period of time running through several ranges and then decrease back through the same, or part of the same, ranges. This defect has limited in general the multiple instrument recorders to operations where there is a continuous increase in signal over the period of time where automatic recording is desired.

The present invention avoids all of the disadvantages referred to above while providing an automatic recording instrument with a practically unlimited number of ranges, which changes range substantially instantaneously either up or down, and which, in the preferred embodiment, is also self-labelling with respect to the ranges covered.

The essential features of the present invention are limit relays at both extremes of travel of the recording pen, with reversal of the direction of reading with each change of range. In other words, if the machine starts recording a signal in the first range of maximum sensitivity from left to right on the recording paper, when the pen reaches its extreme right-hand limit relay actuation throws in the next higher range and, at the same time, reverses the direction of movement of the recording pen which, when in this second range, records an increasing signal from right to left. On reaching the extreme left-hand position, the next range is thrown in automatically and recording proceeds again from left to right. If, then, the signal decreases, so that the pen comes to the extreme left-hand position, ranges are changed down. The same range is always recorded in the same direction, and numbering of the recording paper can be arranged accordingly. There is no retrace of the recording pen and no retrace time so that recording is continuous with time except for the minute fraction of a second required to change ranges. A continuous record with time or other parameter is thus possible.

In the preferred embodiment of the present invention there is also provided a second pen which is moved in accordance with the changing of ranges to make a record, preferably on one side of the paper, of the particular range in which the machine is operating.

It is also desirable in many cases to provide for manual choice of range; for example, where a particular measurement should occur in a particular sensitivity range but will not exceed the extreme limits of the range in question. In one of the more specific modifications of the present invention, manual range changing is included.

It is an advantage of the present invention that extremely reliable electrical elements, such as relays, are used, and it is extremely rare that there is any failure to operate in step under normal conditions. It is, however, possible, by shutting off the machine at the wrong points, or by power failure, to get the machine out of step, and in one of the preferred modifications, there is therefore provided manual setting means for shifting to the desired range and for introducing the proper direction of recording for the range. This re-setting feature is of advantage both in a machine which operates only automatically and also in the more versatile modification where automatic or manual operation may be chosen in the same machine.

It is an advantage of the present invention that the electrical elements are not only very reliable but are also of essentially standard design which facilitates maintenance and permits using conventional power sources. The novelty of the present invention lies not in the use of new elements, but in the combination of elements of standard design to perform the new functions. It is, of course, possible to use any design of switch and relay in the present invention, and it is not intended to limit the invention to any particular mechanical or electrical design of the component elements.

The invention will be described in greater detail in conjunction with a typical device providing, at will, for manual resetting, and for either automatic or manual range changing at will. The specific description will be in connection with the drawings, in which.

Figure 1:
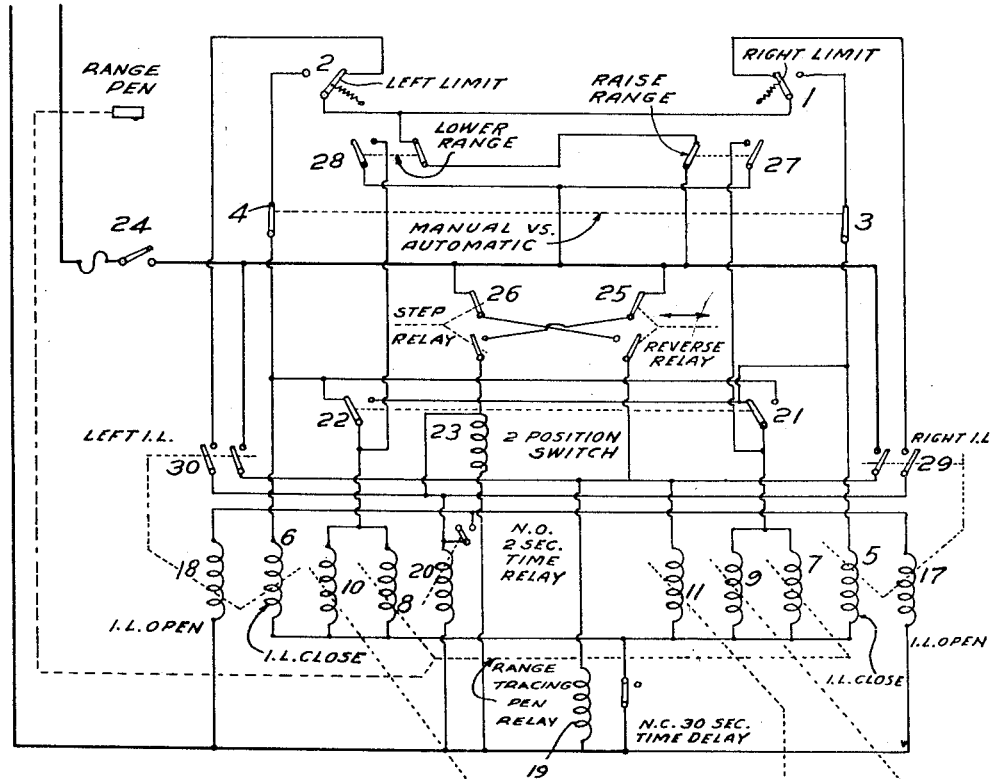
Fig. 1 is a wiring diagram of a typical machine.
Figure 1:
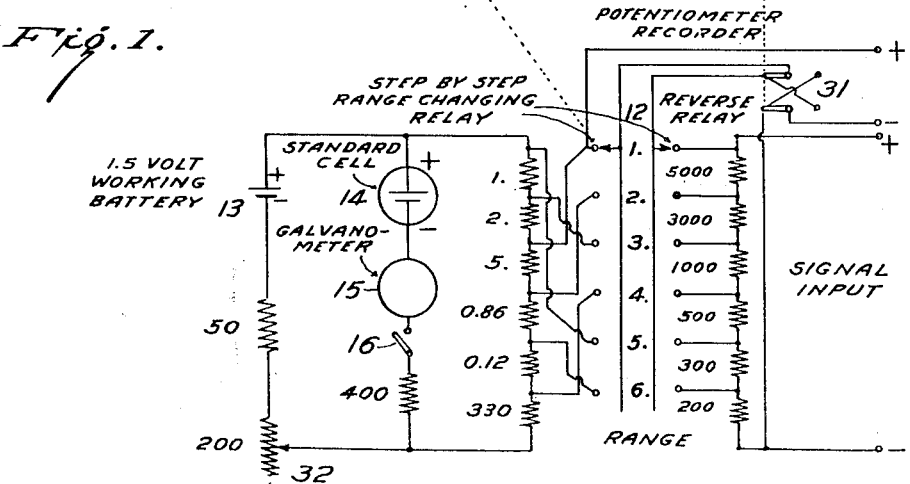

Fig. 1 shows a 110-volt, A. C.-operated device, which is cheap, rugged and reliable. Any other source of electrical operation, such as D. C., may be used. A typical device according to the present invention will be described by reference to the figures in terms of its normal operation through six increasing ranges followed by six decreasing ranges.

Figure 2:
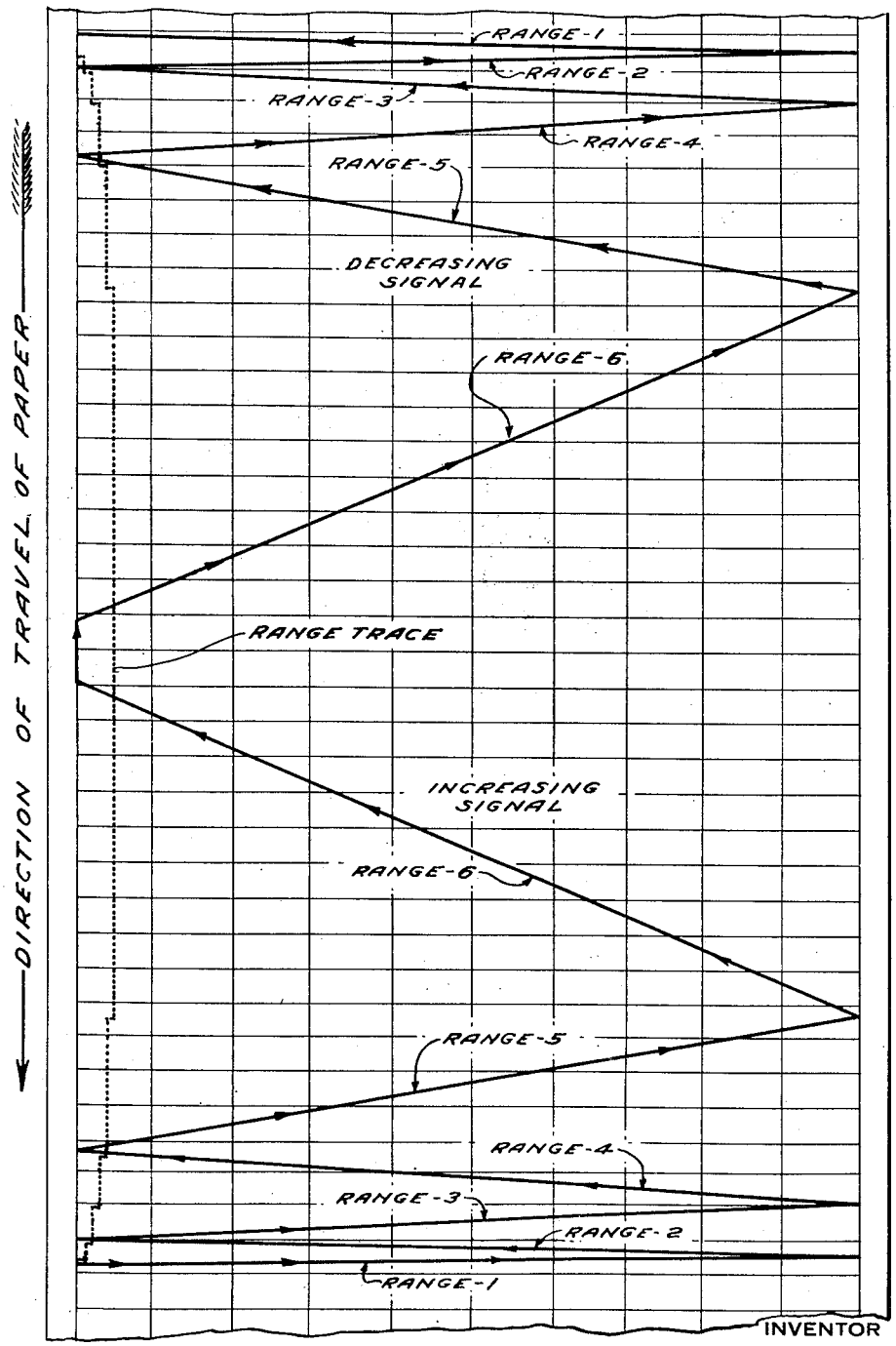
Fig. 2 is a representation of a portion of the record produced by a signal increasing through six ranges and then again decreasing.

In Fig. 1 the spring-loaded, pen-actuated, limit switches 1 and 2 are shown in their unactuated position. One side of a 110-volt A. C. line is shown connected through the customary fuse switch 24 and the manual actuating switches 27 and 28 to the movable contacts of switches 1 and 2. Let it be assumed that the recorder is operating in the first or most sensitive range. If the signal applied to the recorder in opposition to the working battery 13 increases, the pen moves from left to right across the paper as is shown at the bottom of Fig. 2. When it reaches its upper limit at the right-hand side, it actuates switch 1. The current then flows through one of the cut-out switches 3 for manual operation through the coil of the inter-lock close switch 5, and the normally-closed contact of the time-delay switch 19 to the other side of the A. C. line. This actuates the mechanically interlocked switch 29, current then flows through the left-hand contact of that switch through coil 11 of a relay which throws the recorder reversing switch 31. Current also flows through the contacts of switch 21 and coils 7 and 9 of two relays, the first of which moves a range tracing pen, the travel of which is shown in dotted lines at the left-hand side of Fig. 2. The relay, which is a step-by-step relay, moves the pen over one space to indicate the second range. At the same time the current flowing through coil 9 of another step-by-step switch 12, moves the double contacts of this switch one step to throw it into the second range. Current also flows through the switch 29 to the coil 19 of a 30-second delay protective switch. This guards against burning out of the coils 5, 6, 7, 8, 9, 10 and 11 in case the pen should stay in the extreme right-hand position, keeping the switch 1 closed, or in case the machine were shut off in this position. Normally the pen will have moved in one or other direction within the thirty seconds. As soon as the pen has moved to the left, switch 1 springs open and current flows through the mechanically interlocked switch 29 and the coil 20 of a 2-second delay, normally open, switch. At the same time and through the same path, current flows through the coil 23 of a two-position switch and causes it to throw the switch elements 21 and 22 to the reverse position. After two seconds the switch 29 closes and the circuit is completed through the coil 17 of the interlock switch 29, which causes the latter to open.

All of the elements in the upper part of Fig. 1 are now reset to their original position except for the switch elements 21 and 22. As the signal continues to increase through the second range the pen records this increase by moving from right to left as shown in Fig. 2. When it strikes the switch 2 in its extreme left-hand position, current flows through the other cut-out switch 4 for manual operation through the coil 6 of the mechanically-interlocking double-pole switch 30, and thence through the normally closed contacts of switch 19 to the other side of the A. C. line. Switch 30 is closed by the current flow through 6 and remains mechanically locked. It is connected to the same wires as switch 29. Current then flows through the switch contacts 21 and thence through coils 7 and 9 and also through the coils 11 and 19. The pen relay is actuated one further step by coil 7. Coil 11 again reverses the switch 31 to the recorder, and coil 9 moves the range-changing switch contacts 12 one more step to the third range.

With the rising signal, the pen begins to move from left to right in range 3 (Fig. 2), and the switch 2 springs back into its original position, causing current to flow through switch 30 and the coil of switch 29 and coil 23 of the two-position switch. The latter throws the switch contacts 21 and 22 to their original position and after two seconds the closing of the switch 29 causes current to flow through the coil 18 which opens the switch 30, all of the elements in the upper part of the diagram now being in their original position.

When the pen reaches its extreme right-hand position in range 3 the same cycle is repeated as in the case of range 1 and so on through ranges 4, 5 and 6.

After reaching the highest reading in range 6, let it be assumed that the signal now begins to decrease. The pen strikes the right-hand switch 1, but this time the positions of the switch elements 21 and 22 are the reverse of what they were in range 1 because the operation is in an even-numbered range. As a result, while the actuation of switch 29 by flow of current through the switch-closing coil 5 proceeds as described in connection with range 1, current flows through switch elements 22 through coils 8 and 10. These coils actuate the pen and range switch contacts 12, but this time in the opposite direction, moving the pen one space to the left and throwing in range 5. Switch 31 is actuated by coil 11 in the same manner as described in the sequence of increasing ranges. The actuation of switch 29 and the relay 23 proceeds in the manner described above, throwing the switch elements 21 and 22 to the other position and opening the interlock switch 29.

As the signal decreases through range 5, the pen moves from right to left as shown in Fig. 2, until it strikes the left-hand switch 2. This closes the interlock switch 30 as described above, but now current flows again through switch 22 and coils 8 and 10, causing the pen to move one step to the left, and the contacts 12 of the range switch to move to the fourth range. The reversing switch 31 is actuated as described above, and the switches 29 and 23 go through the operation which has been described in connection with each change of range. Further decreases of signal will shift down through ranges 3 and 2 to range 1 in the same manner as described for the shift down from range 6 to ranges 5 and 4.

It will be noted that the reversal of the step-by-step pen relay and range relay is effected whenever the pen in any range begins to reverse itself and reach its lower limit, because the relay 23 has moved the switch contacts 21 and 22 to the opposite position from that which they occupied when the pin encountered either limit switch 1 or 2 in the direction corresponding to a rising signal. Thus, the change of range up or down will occur whenever the signal changes its direction and reaches a limit. The operation is entirely automatic, for the range shift occurs practically instantaneously and there is no retrace time during which a record is not made.

The lower part of Fig. 1 shows switching means operated by the range-changing relay which performs two functions. The resistances on the left-hand side, which are across the working battery 13, determine the bias applied to the signal entering the recorder. This may be thought of in another way as changing the zero point for the pen in each range. Calibration is effected by the standard cell 14, galvanometer 15 and switch 16. The voltages are adjusted to the central zero reading of the galvanometer by means of the variable resistance 32. For some purposes it is sufficient merely to change the zero points for the different ranges. However, a greater spread can be obtained, in many cases without loss of needed accuracy, by varying the sensitivity in each range so that a given travel of the pen will correspond to a different change of signal. This is effected by the tapped potentiometer on the right-hand side of the lower portion of Fig. 1, different values being cut into the circuit by the contacts 12.

It is possible by careless interference with the operation of the machine to throw the recorder-reversing relay 31 into the wrong direction. There is therefore provided a push-button switch 25 which causes a flow of current through the reverse relay operating coil 11 while the button is depressed. This makes it possible to throw the recorder connections into the correct phase for any particular range. It is also possible carelessly to disconnect the machine so that the range switch and the two-position relay 23 may get out of step. This can be corrected by the push-button switch 26 which actuates the relay 23 when it is depressed.

For certain purposes it is desirable to be able to operate the range changing of the machine manually. Manual cut-out switches 3 and 4 are therefore provided which eliminate automatic operation since they disconnect switches 1 and 2 from the interlock-closing coils 5 and 6. When these switches are thrown into their open or manual position, ranges can be changed up and down by operating the push-button switches 27 and 28 respectively. Each time switch 27 is pressed, coils 7, 9 and 11 are actuated, moving range contacts and pen up one range; and each time switch 28 is closed, coils 8, 9 and 11 are actuated so that the range and the range-labelling pen are moved down one step.

In the drawings there has been shown a preferred modification using A. C.-operated switching means. These are illustrative only, and other types of switching means may be used which will perform the same sequence of functions. The preferred design has the advantage that conventional switch elements are used, and the convenient 110-volt A. C. supply is utilized requiring no separate power supply for the range changer.

I claim:

1. A polarized electric signal-actuated recorder of the moving-surface, moving-pen type, the improvement which comprises a plurality of sensitivity range circuits, step-by-step switching means for successively connecting said sensitivity ranges into the instrument, a reversing switch for the recorder signal, pen limit switches actuated by the pen in its extreme limit positions, means actuated by the pen limit switches to operate the reversing switch means and the step-by-step switching means, and an auxiliary reversing switch also actuated by the pen limit switches, said pen limit switches connecting the step-by-step switching means to determine direction of range change whereby actuation of the pen limit switches by a signal continuously increasing or decreasing changes range and reverses pen recording movement.

2. A recorder according to claim 1 having an auxiliary range recording pen actuated by a step-by-step relay in parallel to the step-by-step range changing means.

3. A recorder according to claim 2 in which there are provided manual push-button switches for raising and lowering range and for changing position of said recorder reversing switch and said auxiliary reversing switch.

4. A recorder according to claim 3 in which a manual versus automatic switch is provided in series with the pen limit switches whereby the recorder may be changed from automatic range changing to manual range changing.

CHARLES F. SALZMAN, JR.

References Cited in the file of this patent

UNITED STATES PATENTS

| Number | Name | Date |
|---|---|---|
| 1,784,522 | Harrison | Dec. 9, 1930 |
| 2,424,705 | Parr, Jr. | July 29, 1947 |
| 2,476,005 | Thomas | July 12, 1949 |
| 2,490,674 | Christ et al. | Dec. 6, 1949 |
| 2,516,217 | Keinath | July 25, 1950 |